United States Patent [19]

Duran et al.

[11] Patent Number: 5,590,900
[45] Date of Patent: Jan. 7, 1997

[54] AIR BAG MOUNTING SYSTEM

[75] Inventors: John A. Duran, Glendora; Javier Vargas, Upland, both of Calif.; Merle K. Ricks, Layton, Utah

[73] Assignees: Avibank Mfg., Inc., Burbank, Calif.; Morton International, Inc., Chicago, Ill.

[21] Appl. No.: 505,622

[22] Filed: Jul. 21, 1995

[51] Int. Cl.$^6$ ............................ B60R 21/20; F16B 21/18; F16B 35/02
[52] U.S. Cl. ................. 280/728.2; 280/731; 411/353; 411/508; 411/970; 24/453
[58] Field of Search ................. 280/728.2, 731, 280/732, 730.1, 728.1; 411/353, 352, 182, 508, 509, 913, 970, 999; 24/453, 623, 694

[56] References Cited

U.S. PATENT DOCUMENTS

| | | | |
|---|---|---|---|
| 3,503,431 | 3/1970 | Villo et al. | 411/353 |
| 4,913,461 | 4/1990 | Cuevas | 280/731 |
| 5,009,452 | 4/1991 | Miller | 280/731 |
| 5,076,747 | 12/1991 | Cosenza | 411/353 |
| 5,087,069 | 2/1992 | Corbett et al. | 280/731 |
| 5,207,544 | 5/1993 | Yamamoto et al. | 280/728.2 |
| 5,333,897 | 8/1994 | Landis | 280/728.2 |
| 5,350,190 | 9/1994 | Szigethy | 280/728.2 |

Primary Examiner—Brian L. Johnson
Assistant Examiner—Peter C. English
Attorney, Agent, or Firm—Poms, Smith, Lande & Rose Professional Corporation

[57] ABSTRACT

An air bag mounting system for mounting an air bag module in the preexisting steering wheel air bag receiving pocket of a vehicle. The system includes a mounting plate having a plurality of spaced bolt assemblies extending therefrom receivable in a like plurality of aligned spaced holes in the pocket. The bolt assemblies are non-rotational with respect to the mounting plate and snap into the holes in a locking relationship. The module can be thus mounted from the access side of the pocket, automatically locked thereto, then released by unthreading of a threaded lock portion of the bolt assemblies from the blind side of the pocket.

32 Claims, 6 Drawing Sheets

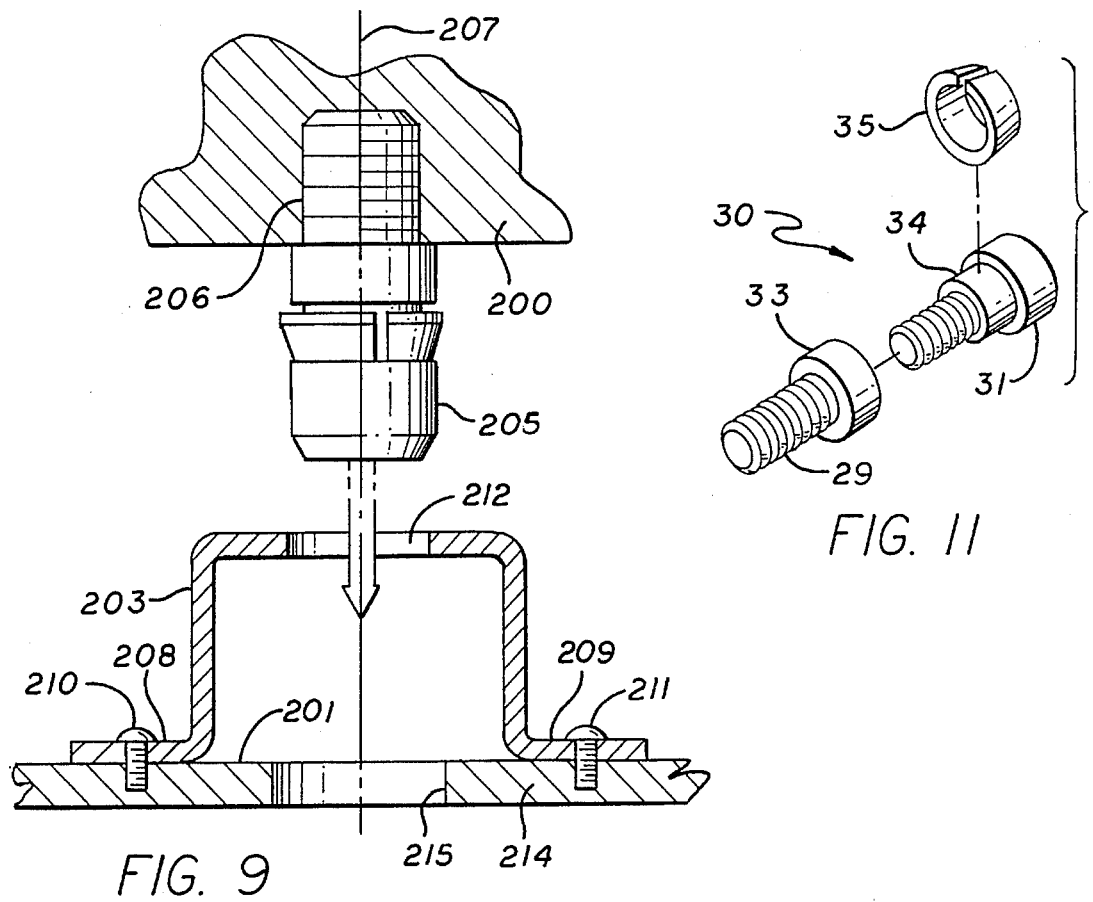
FIG. 9
FIG. 11
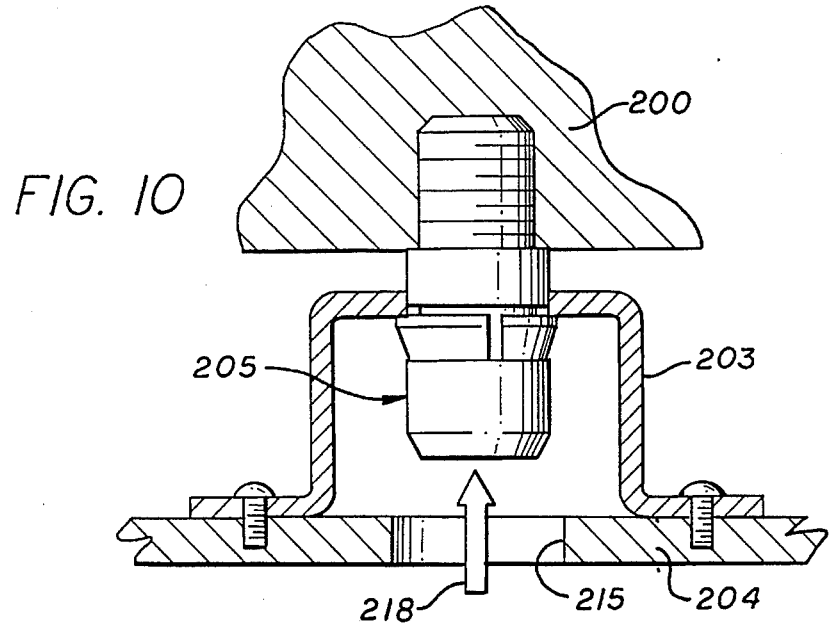
FIG. 10

AIR BAG MOUNTING SYSTEM

BACKGROUND OF THE INVENTION

1. Field of the Invention

The invention relates to air bags; and, more particularly, to a mounting system for mounting air bags in a vehicle.

2. Description of the Prior Art

Air bags have become standard in vehicles in the past few years. Such air bags are usually provided in a restraint module mounted in the driver's side in the center of the steering wheel. Such steering wheels have a central pocket in the hub thereof in which the air bag is mounted.

Various mechanisms have been proposed in the past for securing the inflatable restraint module to a support structure in the vehicle. In one known mounting system, bolts are provided passing from the rear of the support wherein the bolts threadably engage threaded nuts mounted on the restraint module. It is further known to provide such a restraint module mounting system for a vehicle steering wheel wherein sleeve members mounted to the restraint module and surrounding the mounting bolts may be forced into contact with a plate forming the supporting structure on the steering wheel hub to complete a circuit for actuating a horn.

In another known restraint module mounting system, a plurality of hollow support members are mounted to the hub portion of a steering wheel for receiving mounting members depending from the restraint module. Spring clips are provided for engaging through-slots or recesses in the support members and mounting members to releasably secure the mounting members within the support members when the restraint module is moved into place within the hub portion. In this mounting system, the restraint module is immovably held in fixed relation relative to the hub forming the mounting structure.

It is desirable to provide a supplemental inflatable restraint module mounting mechanism wherein the module is adapted to be mounted to support structures without requiring the use of conventional fasteners, such as screws or bolts. It is also desirable to provide such a mounting arrangement wherein the restraint module is retained on a support structure in response to movement of the restraint module in a direction toward the support structure and can be quickly and easily removed therefrom.

Such a system is disclosed in U.S. Pat. Nos. 5,333,897 and 5,350,190. However, in this system, a different method of attachment is disclosed which prevents the bolt from being removed. A special tool is necessary to install the bolt in the U.S. Pat. No. 5,333,897 patent.

There is a need for a quick and easy method and apparatus for mounting an air bag in the pocket of the steering wheel of a vehicle from the exterior or access side thereof which can be quickly and easily snapped in place, has less components than in prior art systems and is less expensive and easier to manufacture.

SUMMARY OF THE INVENTION

It is an object of this invention to provide an air bag module that can be quickly and easily mounted into the pocket of the hub of the steering wheel of a vehicle from the exterior or access side thereof.

It is a further object of this invention to provide such a module that can be released quickly and easily from the blind side or interior of the pocket of the hub of the steering wheel for servicing or the like, then quickly and easily reinstalled.

These and other objects are preferably accomplished by providing an air bag mounting system for mounting an air bag module in the preexisting steering wheel air bag receiving pocket of the hub of a vehicle. The system includes a moving plate having a plurality of spaced bolt assemblies receivable in a like plurality of aligned spaced holes in the pocket. The bolt assemblies are non-rotational with respect to the mounting plate and snap into the holes in a locking relationship. The module can be thus mounted from the access side of the pocket, automatically locked thereto, then released by unthreading of a threaded lock portion of the bolt assemblies from the blind side of the pocket.

BRIEF DESCRIPTION OF THE DRAWINGS

FIG. 9 is detailed cross sectional view of a portion of the assembly of FIG. 8;

FIG. 10 is a view similar to FIG. 9 showing final assembly;

FIG. 11 is an exploded view of the bolt assembly of FIG. 9;

DESCRIPTION OF THE PREFERRED EMBODIMENT

Figure 1:
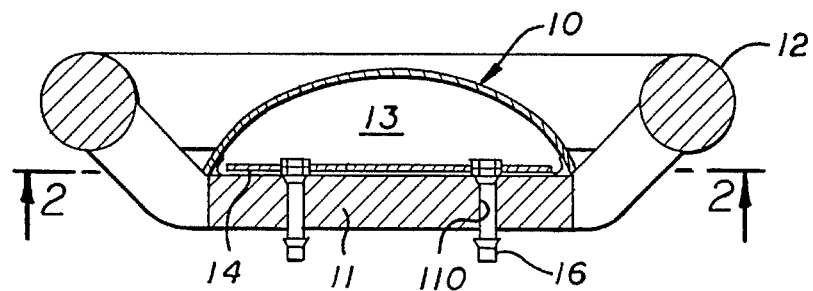
FIG. 1 is an elevational sectional view of an air bag module in accordance with the teachings of the invention mounted in the pocket of the steering wheel of a vehicle.
Figure 2:
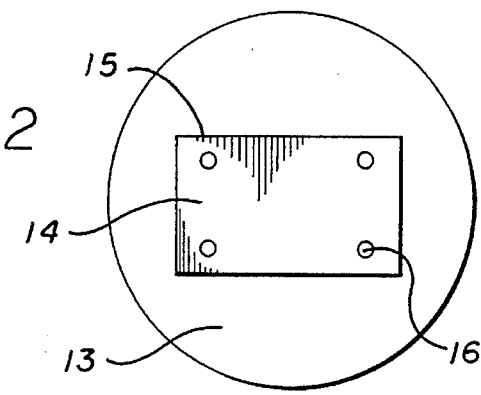
FIG. 2 is a view taken along lines 2—2 of FIG. 1.

Referring now to FIG. 1 of the drawings, an air bag module 10 in accordance with the invention is shown mounted in the pocket 11 of the hub of the steering wheel 12 of a vehicle. Module 10 has a conventional air bag 13 therein mounted to a mounting plate 14. Mounting plate 14 has a plurality of spaced holes 15 therethrough, such as four (see FIG. 2), each hole 15 having a bolt assembly 16 extending therethrough. Bolt assemblies 16 extend through like spaced holes 110 (FIG. 1) in pocket 11 as will be discussed.

Figure 3:
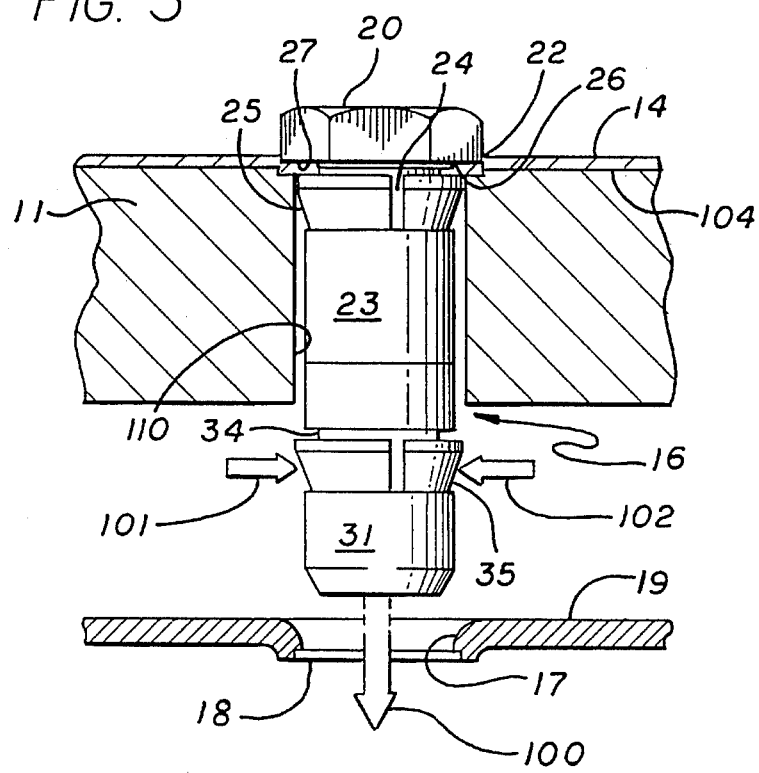
FIG. 3 is an elevational view, partly in section, of the plate portion of the air bag module of FIG. 1 (the air bag being omitted for convenience of illustration) mounted in the pocket of the steering wheel of FIG. 1 prior to engagement with a mounting plate in the vehicle.
Figure 4:
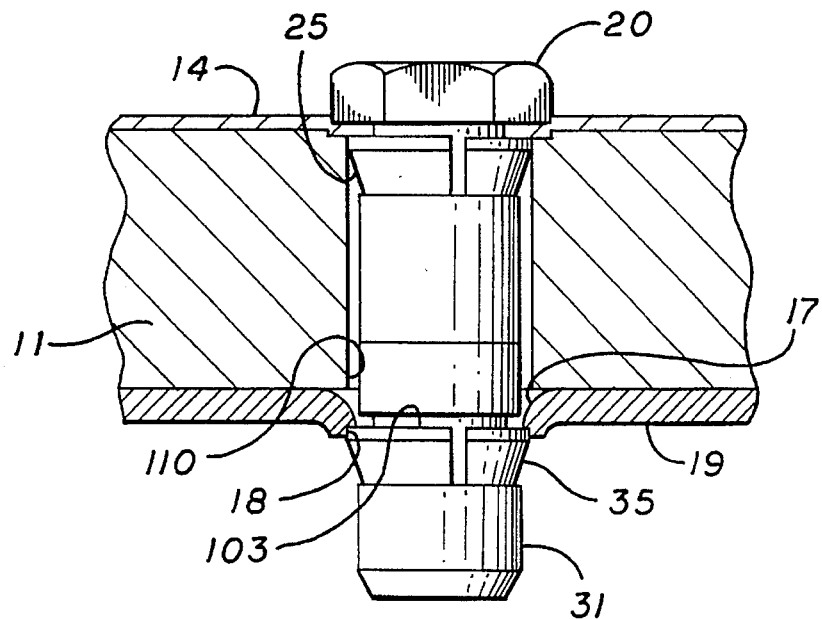
FIG. 4 is a view similar to FIG. 3 illustrating the plate portion of FIG. 4 with its bolt assemblies mounted to the plate of the vehicle.

As seen in FIG. 3, bolt assembly 16 is shown mounted in plate 14. Air bag 13 has been omitted for convenience of illustration. A mounting plate 19 is shown adapted to receive bolt assembly 16 therein in locking relationship. One hole 17 is shown. Hole 17 is counterbored to assist in entry of bolt assembly 16 therein. Also, if desired, plate 19 may be counterbored on its blind side, as at counterbore 18, for reasons to be discussed. The final installed position of bolt assembly 16 is shown in FIG. 4.

Figure 5:
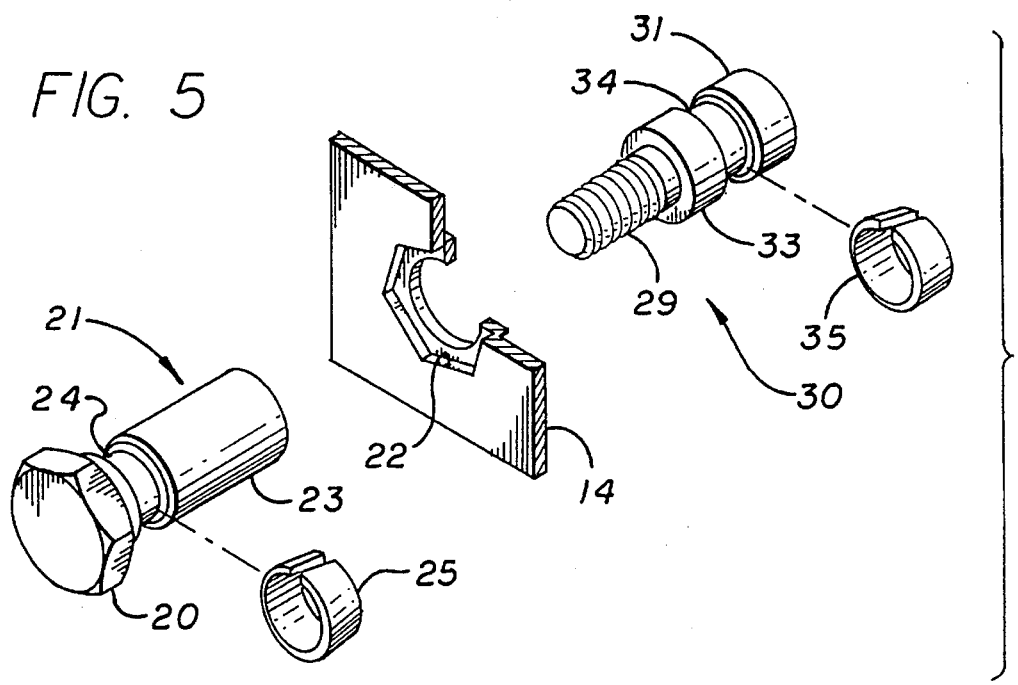
FIG. 5 is an exploded view of one of the bolt assemblies of the air bag module of FIG. 1 and the plate portion alone thereof.

As seen in FIG. 5, plate 14 is counterbored and of a configuration generally related to the configuration of the hex-shaped head 20 of bolt 21 of bolt assembly 16. Thus, a hex-shaped counterbored hole 22 is provided.

The purpose of the hex-shaped head 20 and like configured counterbored hole 22 is to prevent rotation of bolt 21 with respect to plate portion 14 for reasons to be discussed. Thus, any suitable non-rotational means or counterrotating means may be provided, for example, by using elongated slots with like configured heads in place of counterbored holes 22.

Figure 6:
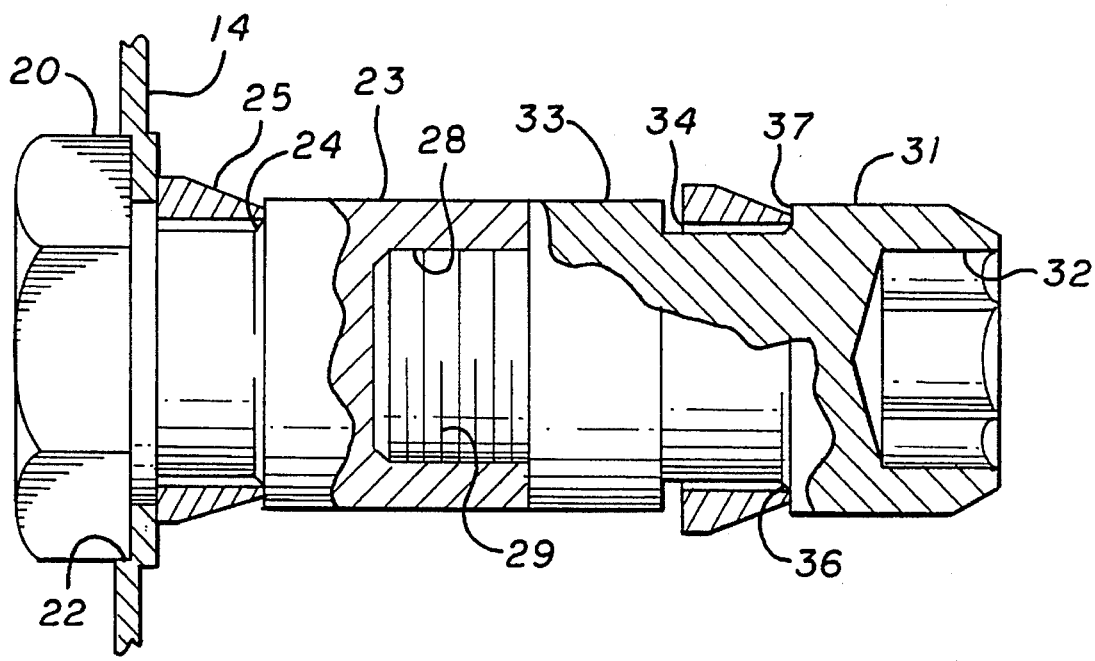
FIG. 6 is a sectional view of one of the assembled bolt assemblies of the invention.

As seen in FIGS. 5 and 6, bolt 21 includes aforementioned head 20 and an integral cylindrical shank portion 23. A reduced neck portion 24 is provided between head 20 and shank portion 23 adapted to receive therein in snap fitting relationship a split ring 25.

As seen in FIG. 6, the interior of shank portion 23 is threaded at threaded portion 28 and is adapted to threadably receive therein the threaded shank 29 (FIG. 5) of bolt 30. Bolt 30 has a head 31 with a hex socket 32 (FIG. 6) and a shank portion 33 of a diameter substantially equal to the diameter of head 31 (FIG. 5). A reduced neck portion 34 is provided between head 31 and shank portion 33 for receiving therein a split ring 35 similar to ring 25. A tapered portion 36 (FIG. 7) may be provided between the underside 37 of head 31 and reduced neck portion 34. Also, the overall length between underside 37 and the intersection of reduced neck portion 34 with shank portion 33 may be slightly greater than the width of split ring 35 to accommodate wheel bracket or mounting plate 19. Although head 31 is shown as round with a hex socket 32, obviously it may be of any suitable configuration depending on the application and the customer's desires.

In like manner, as seen in FIG. 3, the underside 27 of head 20 tapers downwardly and inwardly toward reduced neck portion 24 at taper 26. Also, it can be seen that the distance between underside 27 and the intersection of neck portion 24 with shank portion 23 is greater than the width of ring 25 so that panel 14 may fit between head 20 and shank portion 23.

Both split rings 25, 35 taper at one end to a relatively sharp edge.

In operation, prior to mounting air bag 13 to plate 14 (FIG. 1), bolt assemblies 16 are installed by installing split ring 25 (FIG. 5) in reduced neck portion 24, inserting shank portion 23 through hole 22 from the access side of plate 14 until head 20 rests therein; then installing split ring 35 in reduced neck portion 34 and threading threaded shank 29 into the threaded portion 28 (FIG. 6) of shank portion 23.

The final installed position of bolt assemblies 16 is shown in FIG. 3.

The air bag module 10 (FIG. 1) is shown in FIG. 3 as mounted in pocket 11 by having pushed bolt assemblies 16 through holes 110 in pocket 11 in the direction of arrow 100 and into holes 17 on plate 19. The engagement of the sides of hole 17 with split ring 35 forces split ring 35 inwardly in the direction of arrows 101, 102 gripping reduced neck portion 34 until the end 103 of split ring 35 snaps into counterbore 18 in plate 19 as seen in FIG. 4. As heretofore discussed, counterbore 18 is optional and ring 35 can abut directly against the underside of plate 19.

When split ring 25 is mounted through hole 22 in plate 14, it first is moved inwardly in like manner by engagement with the sides of hole 22, then snaps back out abutting against the underside 104 of plate 14 as seen in FIG. 3.

Thus, four bolt assemblies 16 are initially installed in plate 14, with bolts 30 threaded thereto, the air bag 13 (FIG. 1) is installed on top thereof. The entire unit, with bolt assemblies 16 hanging down, may be shipped to a customer in this condition where the customer has a steering wheel 12 with a hub with a pocket 11 therein with holes 110 therein spaced similarly to the spacing of bolt assemblies 16 and like holes 17 in mounting bracket or plate 19. Again, any suitable number of bolt assemblies and receiving holes may be used.

The heads 20 cannot rotate in holes 22 in plate 14. The bolt assemblies 16 extend through holes 110 in pocket 11 and enter the holes 17 in plate 19 and snap into place.

No tools are required to assemble the air bag modules 10 to steering wheel 12. A quick and easy snap-in assembly is provided, locked in place and cannot come back out. The module 10 cannot come back out due to the fact that rings 25, 35 cannot move out of the holes 17, 22 in plates 19, 14, respectively.

If maintenance is necessary and air bag module 10 must be removed from pocket 11, the mechanic merely inserts a hex wrench in socket 32 (FIG. 6) from the blind side of steering wheel 12 and unthreads threaded portion 29 out of threaded socket 28 releasing bolt 30 from bolt 21 (FIG. 5). The non-rotation of bolt 21 is accomplished in the mating hex configurations. Split ring 35 thus is disengaged from its locking abutting relationship with the counterbore 18 in hole 17 and the entire air bag module 10, attached to plate 14, can be lifted out of pocket 11 in the opposite direction of arrow 100 in FIG. 3. Module 10 can be quickly and easily reinstalled by reinsertion in the direction of arrow 100 with bolt 30 already threaded to bolt 21.

As heretofore mentioned, any suitable non-rotating means between head 20 and hole 22 may be used, such as an oblong hole and like configured head.

In order to keep snap ring 35 at the right location due to the loads thereon encountered in use, chamfer or taper 36 (FIG. 6) is provided at the underside 37 of head 31. The angle thereof may be about 30° and thus assists in centering the snap ring to provide as much surface area on the engagement with hole 17 as possible to carry the high load. The taper 36 forces the ring 35, normally free to rotate up and down, into a centered position, since it rides on the chamfer on taper 36.

The counterbore 18, although optional, allows the ring 35 to snap therein providing a higher load capability.

Figure 7:
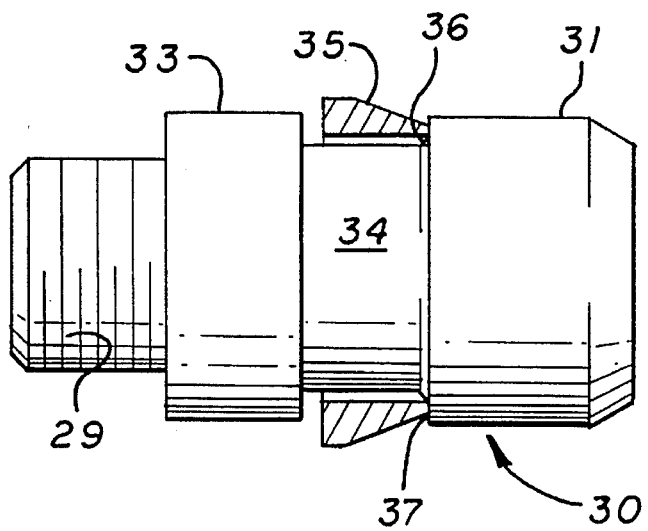
FIG. 7 is an elevational sectional view of a bolt alone of the bolt assembly of FIG. 6.

Although air bag module 10 may have any suitable configuration, various mounts may be used depending on the vehicle involved and on the area of the vehicle in which the air bag is to be mounted. Thus, in another embodiment of the invention, as seen in FIGS. 8 to 14, wherein like numerals refer to like parts of the embodiment of FIGS. 1–7, another type of air bag module 200 is shown generally rectangular in configuration adapted to be mounted in a like configured pocket 201 in the hub of a steering wheel 202. As seen in FIG. 9, module 200 has a plurality, such as two (see FIG. 8—two brackets 203, 204 are provided), of bolt assemblies 205. Bolt assemblies 205, as seen in FIG. 9, have threaded shafts 206 and integral collar portions 402. Bolt assemblies 205 further include a threaded shaft 403 (FIG. 11) of a bolt 404 having an enlarged head 405 with a hex socket therein as socket 32 in FIG. 6, and a reduced neck portion 406. Shaft 403 may be receivable in a threaded socket (not shown) internal of collar portion 402 as discussed with respect to FIG. 5. Split ring 35, identical to the split ring 35 of FIG. 7, is mounted between collar portion 402 and head 405 as seen in FIG. 9. Alternatively, assemblies 205 may be one integral piece and thus selectively threaded and unthreaded from hole 207. Since a bolt assembly 205 of one integral piece would be identical in illustration to that shown in FIG. 9, further illustration is deemed unnecessary. Thus, shaft 206 is adapted to be threaded into like threaded holes 207 in the underside of module 200 (FIG. 9) for securing the same thereto.

Figure 8:
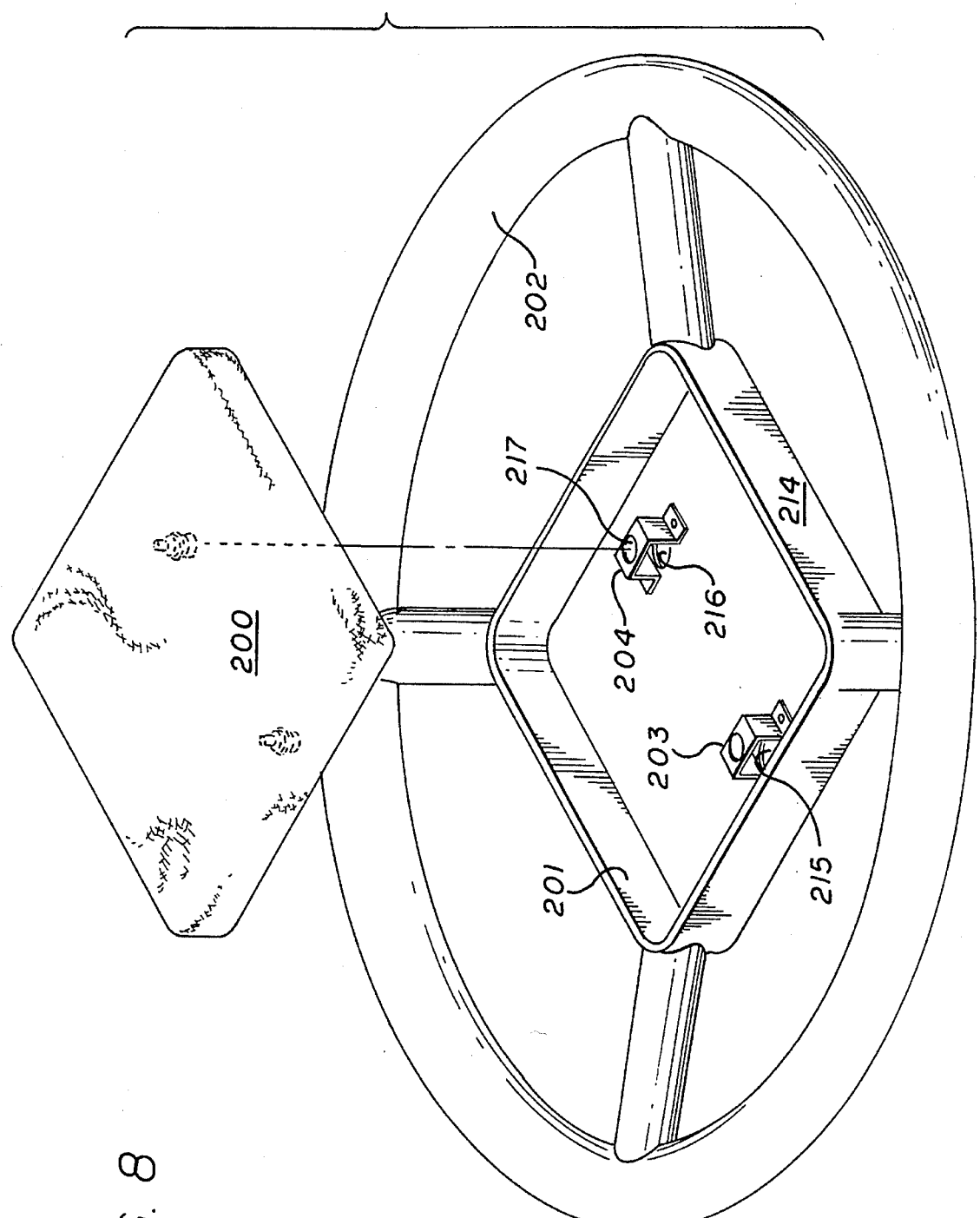
FIG. 8 is an exploded view of a modification of the assembly of FIGS. 1 to 7.

Only bracket 203 is shown in FIG. 9 but bracket 204 of FIG. 8 is identical. Thus, each bracket, as bracket 203 in FIG. 9, is generally U-shaped with laterally extending apertured flanges 208, 209 secured to pocket 201 by suitable rivets 210, 211, respectively. A hole 212 is centrally located in the bail portion 213 of each bracket 203, 204 similar to hole 17 in aforementioned plate 19. Receptacle 214, as seen in FIG. 9, has an access hole 215 (see FIG. 8—a similar hole 216 is disposed under bracket 204) aligned with hole 212 in bracket 203. Hole 216 is of course also aligned with hole 217 in bracket 204 as seen in FIG. 8. Brackets 203, 204, although described as U-shaped, may be any suitable configuration, such as flat, depending on the available clearance in the installation.

It can be appreciated that bolt assemblies 205 are aligned with holes 212, 217 in brackets 203, 204 and that any suitable number and spacing thereof of bolt assemblies and brackets may be provided.

Thus, module 200 may be quickly and easily mounted in pocket 201 by bolt assemblies 205 entering holes 212, 217 in brackets 203, 204 and snapping into position therein as seen in FIG. 10. A suitable tool, not shown, may be inserted into access hole 215 in the direction of arrow 218 into engagement with bolt assembly 205 to unthread the bolt 404 thereof as heretofore discussed with respect to the embodiment of FIGS. 1 to 7. In the embodiment where bolt assembly 205 is one integral piece, it is merely unthreaded out of hole 207. However, if a two piece bolt assembly is used as in FIG. 11, it is necessary that a mechanical bonding or lock, as is well known in the art, be provided between the threads of hole 207 and threads 206 (FIG. 11) to permanently bond bolt end 206 in place so it won't back off when bolt 404 is unthreaded from collar portion 402.

Figure 12:
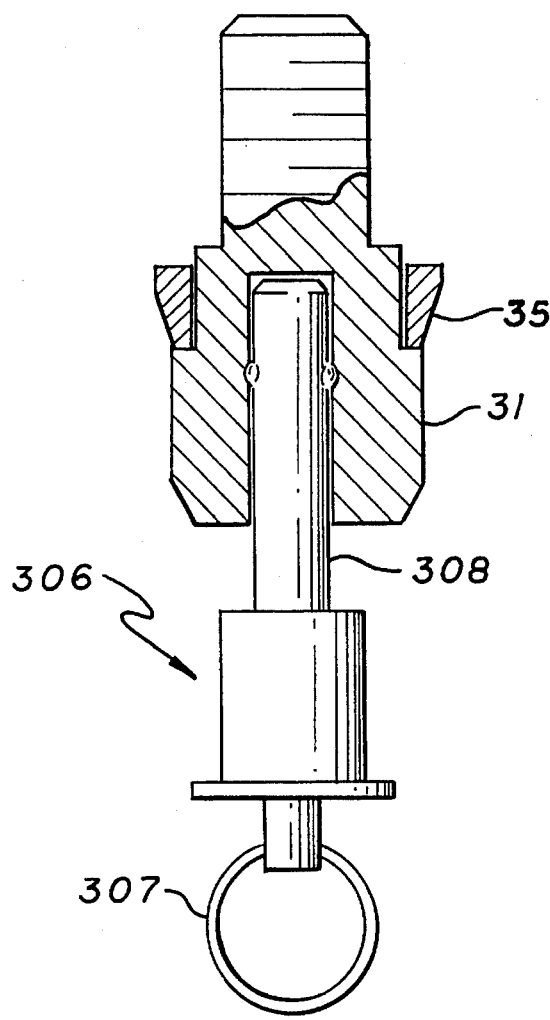
FIG. 12 is an exploded view partly in section, of another modification of the assembly of FIGS. 1 to 11.
Figure 13:
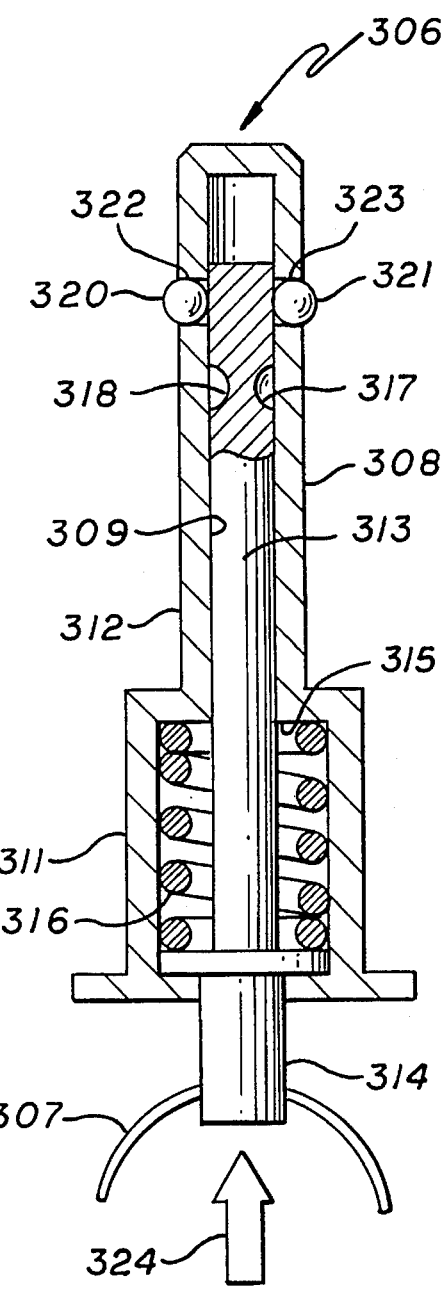
FIG. 13 is an elevational view, partly in section, of the tool alone of the embodiment of FIG. 12.
Figure 14:
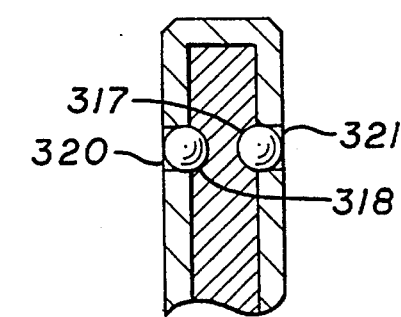
FIG. 14 is a detailed sectional view of a portion of the tool of FIG. 13 illustrating an operative feature thereof.

In another embodiment of the invention, as seen in FIGS. 12 to 14, the removal of bolt 30 from the embodiments of FIGS. 1 to 11 can be made tamper proof by providing a special tool for removing bolt 30. Thus, as seen in FIG. 12, where again like parts refer to the embodiments of FIGS. 1 to 11, instead of bolt 30, bolt 300 is provided having a bolt head 400, integral threaded shaft 401, reduced neck portion 301 and split ring 302 as heretofore discussed. Instead of hex sockets 32, cylindrical bore 303 is provided having spaced holes 304, 305 in the sides of the cylindrical wall forming bore 303.

A special tool 306 is provided having a ring 307 at one end and an elongated cylindrical shaft 308 extending therefrom. Shaft 308 has a first portion 311 (see FIG. 13) of a first diameter and an integral second cylindrical portion 312 of a lesser diameter. Portion 312 is of the same internal diameter of bore 303 so that it can be inserted therein. As another tamper proof feature, the diameters of bore 303 and shaft portion 312 may be non-conventional to prevent use of a conventional tool. The special tool is referred to in the trade as a ball locking device and has a throughbore 309 with an elongated pin 313 reciprocal therein. Pin 313 has one end 314 of greater diameter than the remaining portion of pin 313 extending out of portion 311 to which ring 307 is attached. Pin 313 also has an integral flange portion 315 against which spring 316 abuts. Spring 316 encircles pin 313 between flange portion 315 and abuts against a shoulder 317 formed at the intersection of portions 311, 312.

Pin 313 also has spaced cavities 318, 319 for receiving balls 320, 321, respectively, therein. Balls 320, 321 are mounted in holes 322, 323, respectively, extending through the cylindrical wall of portion 312. As is well known in the art, holes 322, 323 are slightly larger in diameter than the largest diameter of balls 320, 321 and the openings or holes 322, 323 may be peened about the outer surfaces thereof.

The foregoing has described a conventional ball locking device and, other than in the context of this invention, forms no particular part of the invention. Thus, the device illustrated in FIG. 12 shows the tool in a position where balls 320, 321 extend out of holes 322, 323. When pin 313 is moved against the bias of spring 316, in the direction of arrow 324, cavities 318, 319 move to the position shown in FIG. 14 and balls 320, 321 move back inside of cylindrical portion 312. This is the unlocking position of the tool.

Thus, referring again to FIG. 12, pin 313 is pushed against the bias of spring 316, moving balls 320, 321 to the FIG. 14 position, and cylindrical portion 312 is inserted into cavity 303. Pin 313 is now released from its spring bias and balls 320, 321 enter holes 304, 305 and lock therein. The tool 306 can now be rotated to unthread portion 29 or 401 from portion 23 or hole 207 of either of the foregoing embodiments.

Any suitable dimensions or materials may be used. It can be seen that we have discussed a quick and easy system for installing an air bag module in the cavity or pocket of a conventional steering wheel. Obviously, instead of a steering wheel, the invention herein resides in the quick and easy mounting of an air bag module to a preexisting holed bracket or plate. Thus, any suitable mounting means may be used wherever it is desired to mount an air bag on a vehicle.

Although a specific embodiment of the invention has been disclosed, variations thereof may occur to an artisan and the scope of the invention is only considered to be limited by the scope of the appended claims.

We claim:

1. An air bag module adapted to be mounted to a preexisting vehicle mounting receptacle comprising:
    a mounting plate having a plurality of bolt assemblies extending therefrom, each of said bolt assemblies including:
        a first bolt connected to said mounting plate having an enlarged head mounted in a hole through said plate and a shank portion integral therewith having a threaded portion on an interior thereof;
        a second bolt having an enlarged head, said second bolt having an integral shank portion with a reduced neck portion between said shank portion of said second bolt and said head, a threaded portion extending from said shank portion of said second bolt threadably engaging said threaded portion in said shank portion of said first bolt, a split ring mounted in said reduced neck portion of said second bolt; and
        anti-rotation means associated with said first bolt to prevent rotation of said first bolt with respect to said hole through said plate when said threaded portion of said second bolt is unthreaded from engagement with said threaded portion of said first bolt.

2. In the module of claim 1 wherein said split ring tapers from one end to the other forming a wide end and a thin end, the wide end of said split ring being disposed toward said enlarged head of said first bolt.

3. In the module of claim 2, wherein said head of said second bolt has a chamfered portion chamfered from an underside thereof to said reduced neck portion.

4. In the module of claim 3 wherein said chamfered portion is at an angle of about 30°.

5. In the module of claim 4 wherein said head of said first bolt and said hole are hex-shaped in configuration.

6. In the module of claim 1 wherein said anti-rotation means comprises the head of said first bolt being of an irregularly-shaped outer configuration, the interior of said hole being configured similarly to said head whereby the engagement of said head of said first bolt with said hole prevents rotation thereof.

7. In the module of claim 6 including a hex-shaped socket in said head of said second bolt for receiving a tool therein.

8. In the module of claim 1 wherein said hole is countersunk on the side of said plate receiving the head of said first bolt thereon.

9. In the module of claim 1 including a socket in said head of said second bolt for receiving a tool therein.

10. In the module of claim 9 wherein said socket includes a peripheral wall with a plurality of holes therein, said holes being adapted to receive balls therein in locking relationship.

11. In the module of claim 10 including a tool having a cylindrical portion receivable in said socket, said tool having an internal reciprocal spring biased pin abutting against a pair of balls mounted in openings in said cylindrical portion normally biasing said balls into said openings in said cylindrical portion, said pin also having a pair of cavities therein adapted to receive said balls therein when said pin is reciprocated in said tool to move said balls out of said openings in said cylindrical portion whereby, when said cylindrical portion is inserted into said socket and said pin is moved against its spring bias, said balls move into said cavities and out of said openings in said cylindrical portion, then when said pin is released from its spring bias, said pin abuts against said balls moving them into said openings in said cylindrical portion and into locking engagement with the holes in the peripheral wall of said socket.

12. In an air bag module having a mounting plate, and a plurality of spaced bolt assemblies extending from said mounting plate, each of said bolt assemblies comprising:

a first bolt connected to said mounting plate having an integral shank portion and having a threaded portion on an interior thereof;

a second bolt having an enlarged head, said second bolt having an integral shank portion with a reduced neck portion between said shank portion and said head of said second bolt, a threaded portion extending from said shank portion of said second bolt threadably engaging said threaded portion in said shank portion of said first bolt; and a split ring mounted in said reduced neck portion of said second bolt.

13. In the module of claim 12 wherein said split ring tapers from one end to the other forming a wide end and a thin end.

14. In the module of claim 12 wherein said head of said second bolt is chamfered from an underside thereof to the reduced neck portion.

15. An air bag module adapted to be mounted to a preexisting vehicle mounting bracket comprising:

a mounting plate having a plurality of spaced holes extending therethrough;

an air bag mounted on one side of said mounting plate;

a plurality of bolt assemblies extending through respective ones of said spaced holes in said mounting plate, each of said bolt assemblies including:

a first bolt having an enlarged head mounted in one of said holes in said mounting plate;

a shank portion integral with said head and extending through said hole having a threaded portion on an interior thereof;

a reduced neck portion between said shank portion and said head;

a first split-ring mounted in said reduced neck portion and abutting against an underside of said plate;

a second bolt having an enlarged head, said second bolt having an integral shank portion with a reduced neck portion between said shank portion of said second bolt and said head of said second bolt, a threaded portion extending from said shank portion of said second bolt threadably engaging said threaded portion in said shank portion of said first bolt, a second split ring mounted in said reduced neck portion of said second bolt; and anti-rotation means associated with both said head of said first bolt and said hole in said mounting plate to prevent rotation of said first bolt with respect to said hole when said threaded portion of said second bolt is unthreaded from engagement with said threaded portion of said first bolt.

16. In the module of claim 15 wherein each of said split rings tapers from one end to the other forming a wide end and a thin end, the wide end of said first split ring adapted to abut against the underside of said plate when said module is pulled away from said bracket.

17. In the module of claim 15 wherein said head of said first bolt has a chamfered portion chamfered from underside thereof to said reduced neck portion of said first bolt.

18. In the module of claim 17 wherein said chamfered portion is at an angle of about 30°.

19. In the module of claim 15 wherein said anti-rotation means comprises the head of said first bolt being of an irregularly-shaped outer configuration, said hole having a peripheral wall configured similarly to the outer configuration of said head whereby the engagement of said head of said first bolt with said hole prevents rotation thereof.

20. In the module of claim 19 wherein said head of said first bolt and said hole are hex-shaped in configuration.

21. In the module of claim 15 wherein said hole is countersunk on the side of said plate receiving the head of said first bolt thereon.

22. In the module of claim 15 including a socket in said head of said second bolt for receiving a tool therein.

23. In the module of claim 22 wherein said socket is hex-shaped.

24. An air bag mounting system for a vehicle wherein said vehicle has a mounting receptacle therein comprising:

a mounting plate having a plurality of bolt assemblies extending therefrom, each of said bolt assemblies including:

a first bolt connected to said mounting plate having an enlarged head mounted in a hole through said plate and a shank portion integral therewith having a threaded portion on an interior thereof;

a second bolt having an enlarged head, said second bolt having an integral shank portion with a reduced neck portion between said shank portion of said second bolt and said head, a threaded portion of said second bolt threadably engaging said threaded portion in said shank portion of said first bolt, a split ring mounted in said reduced neck portion; and anti-rotation means associated with said first bolt to prevent rotation of said first bolt with respect to said hole through said plate when said threaded portion of said second bolt is unthreaded from engagement with said threaded portion of said first bolt, said mounting receptacle on said vehicle having a plurality of spaced holes receiving said second bolts therein.

25. In the system of claim 24 wherein said split ring tapers from one end to the other forming a wide end and a thin end, the wide end of said split ring abutting against an underside of a respective hole in said receptacle when said second bolts are mounted in said holes and said module is pulled away from said receptacle to thereby prevent removal thereof.

26. An air bag mounting system for a vehicle wherein said vehicle has a mounting bracket, the system comprising:

a mounting plate having a plurality of spaced holes extending therethrough;

an air bag mounted on one side of said mounting plate;

a plurality of bolt assemblies extending through respective ones of said spaced holes in said mounting plate, each of said bolt assemblies including:

a first bolt having an enlarged head mounted in one of said holes in said mounting plate;

a shank portion integral with said head and extending through said hole having a threaded portion on an interior thereof;

a reduced neck portion between said shank portion and said head;

a first split-ring mounted in said reduced neck portion and abutting against an underside of said plate;

a second bolt having an enlarged head, said second bolt having an integral shank portion with a reduced neck portion between said shank portion of said second bolt and said head of said second bolt, a threaded portion extending from said shank portion of said second bolt threadably engaging said threaded portion in said shank portion of said first bolt, a second split ring mounted in said reduced neck portion of said second bolt; and anti-rotation means associated with both said head of said first bolt and said hole in said mounting plate to prevent rotation of said first bolt with respect to said hole when said threaded portion of said second bolt is unthreaded from engagement with said threaded portion of said first bolt.

27. In the system of claim 26 wherein said mounting bracket has a plurality of holes receiving the heads of said second bolts therethrough, said second split rings being adapted to abut against an underside of said bracket when said mounting plate is pulled away from said bracket.

28. In the system of claim 27 wherein each said second split ring tapers from one end to the other forming a wide end and a narrow end, the wide end thereof adapted to abut against the underside of said bracket when said mounting plate is pulled away from said bracket.

29. In the system claim 27 including a counterbore in the underside of said bracket surrounding each said hole therethrough, said second split rings being receivable in said counterbores and adapted to abut thereagainst when said mounting plate is pulled away from said bracket.

30. In the second system of claim 27 wherein an underside of said head of said second bolt between said head of said second bolt and said reduced neck portion of said second bolt includes a chamfered portion.

31. In the system of claim 30 wherein said chamfered portion of said second bolt is at an angle of about 30°.

32. An air bag module adapted to be mounted to a vehicle mounting receptacle comprising:

a mounting plate having a plurality of bolt assemblies extending therefrom, each of said bolt assemblies including:

a first bolt connected to said mounting plate having an enlarged head mounted in a hole through said plate and a shank portion integral therewith having a threaded portion therein;

a second bolt having an enlarged head, said second bolt having an integral shank portion, a threaded portion extending from said shank portion of said second bolt threadably engaging said threaded portion of said shank portion of said first bolt, a split ring mounted on the shank portion of said second bolt in snap fitting relationship between the head and threaded portion thereof; and anti-rotation means associated with said first bolt to prevent rotation of said first bolt with respect to said hole through said plate when said threaded portion of said second bolt is unthreaded from engagement with said threaded portion of said first bolt.

* * * * *

UNITED STATES PATENT AND TRADEMARK OFFICE
CERTIFICATE OF CORRECTION

PATENT NO. : 5,590,900
DATED : January 7, 1997
INVENTOR(S) : John A. Duran, Javier Vargas, and Merle K. Ricks It is certified that error appears in the above-indentified patent and that said Letters Patent is hereby corrected as shown below:

Col. 8, line 39, after "from", insert --an--.

Signed and Sealed this

Thirteenth Day of May, 1997

Attest:

BRUCE LEHMAN

*Attesting Officer*    *Commissioner of Patents and Trademarks*